(12) United States Patent
Kawashima

(10) Patent No.: US 10,185,301 B2
(45) Date of Patent: Jan. 22, 2019

(54) NUMERICAL CONTROLLER HAVING ACQUISITION FUNCTION OF COORDINATE VALUE NEEDING NEITHER SKIP SIGNAL NOR KEY OPERATION

(71) Applicant: FANUC Corporation, Minamitsuru-gun, Yamanashi (JP)

(72) Inventor: Yuusuke Kawashima, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 308 days.

(21) Appl. No.: 15/098,438

(22) Filed: Apr. 14, 2016

(65) Prior Publication Data

US 2016/0313723 A1 Oct. 27, 2016

(30) Foreign Application Priority Data

Apr. 22, 2015 (JP) ................................. 2015-087836

(51) Int. Cl.
| | | |
|---|---|---|
| G05B 19/18 | (2006.01) | |
| G05B 19/19 | (2006.01) | |
| G05B 19/402 | (2006.01) | |
| G05B 19/4063 | (2006.01) | |

(52) U.S. Cl.
CPC ....... *G05B 19/402* (2013.01); *G05B 19/4063* (2013.01); *G05B 2219/35291* (2013.01); *G05B 2219/50047* (2013.01)

(58) Field of Classification Search
CPC .... G01B 5/004; G01B 5/008; B23Q 17/2266; G05B 19/182; G05B 2219/37408; G05B 19/19

USPC .......................................... 700/150, 192, 193
See application file for complete search history.

(56) References Cited

U.S. PATENT DOCUMENTS

| 6,971,273 | B2 * | 12/2005 | Kostenick, Jr. ...... | G01M 99/008 72/20.1 |
|---|---|---|---|---|
| 9,760,079 | B2 * | 9/2017 | Hasegawa ................ | B23H 7/06 |
| 2015/0012120 | A1 | 1/2015 | Yoshimura | |

FOREIGN PATENT DOCUMENTS

| JP | S61-26110 A | 2/1986 |
|---|---|---|
| JP | H02-64714 A | 3/1990 |
| JP | H05-66820 A | 3/1993 |
| JP | 2000-198046 A | 7/2000 |

(Continued)

OTHER PUBLICATIONS

Notification of Reasons for Refusal dated May 23, 2017 in Japanese Patent Application No. 2015-087836 (3 pages) with an English Translation (2 pages).

*Primary Examiner* — Michael J Brown
(74) *Attorney, Agent, or Firm* — Drinker Biddle & Reath LLP

(57) ABSTRACT

A numerical controller controls a machine tool that measures a coordinate value of an object to be measured based on a position of a movable axis controlled by a manual operation. The numerical controller stores a plurality of pieces of history information formed by associating the coordinate value of the movable axis and an elapsed time from a reference time point when the coordinate value is acquired, analyzes timing when position adjustments of the movable axis are completed based on the stored history information, and sets the coordinate value of the movable axis at the analyzed timing.

8 Claims, 8 Drawing Sheets

(56) References Cited

FOREIGN PATENT DOCUMENTS

| JP | 2001-51712 A | 2/2001 |
|----|--------------|--------|
| JP | 2002-116016 A | 4/2002 |

* cited by examiner

FIG.4
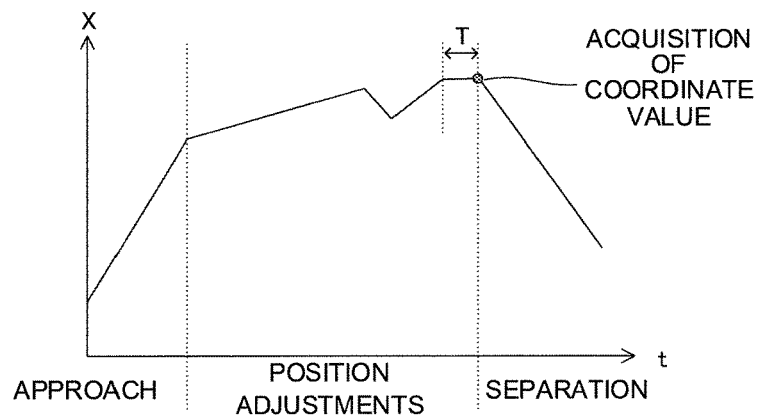
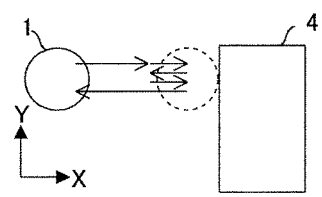
FIG.5
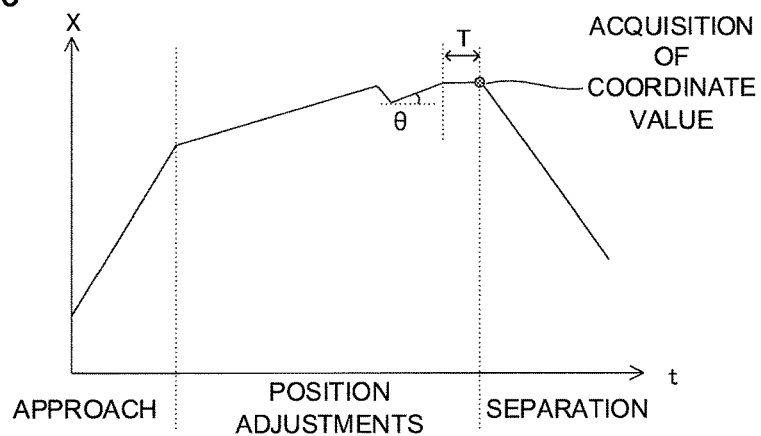
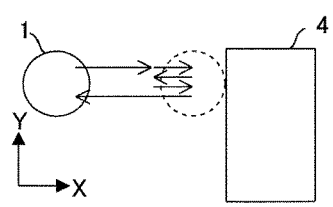

FIG.7
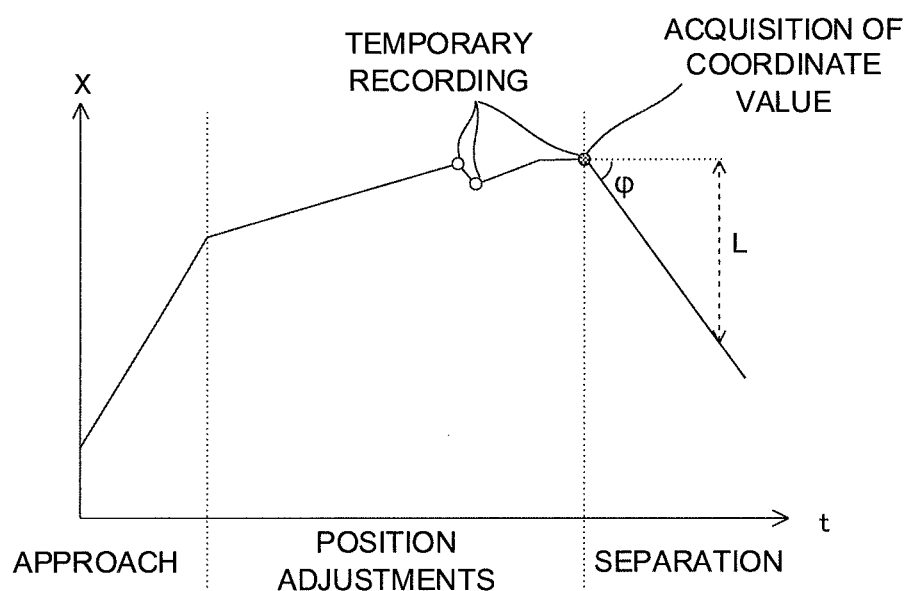
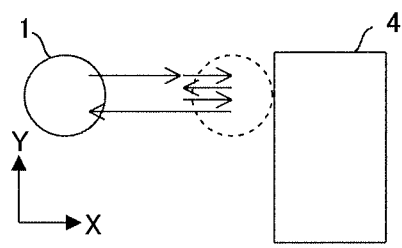

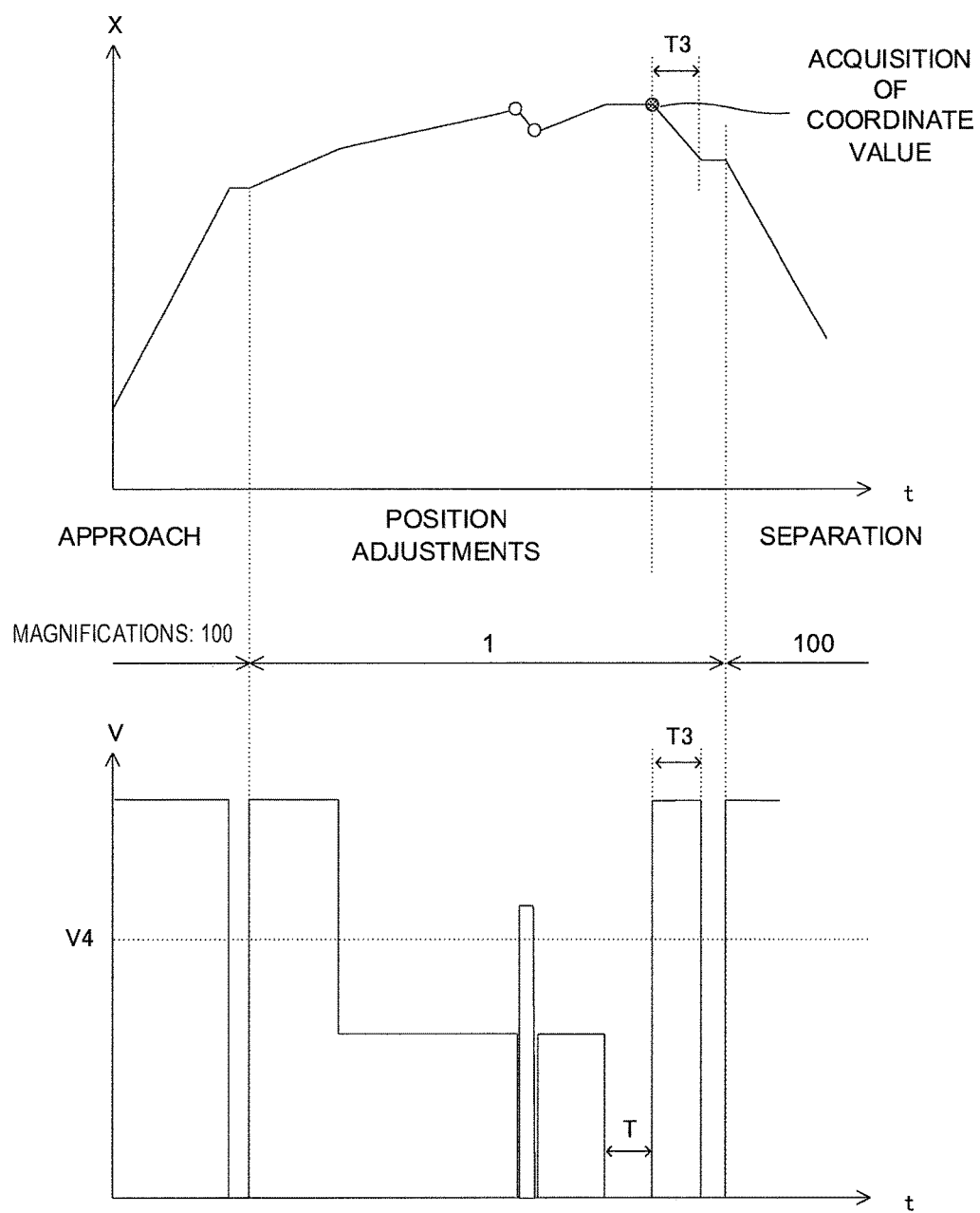

NUMERICAL CONTROLLER HAVING ACQUISITION FUNCTION OF COORDINATE VALUE NEEDING NEITHER SKIP SIGNAL NOR KEY OPERATION

RELATED APPLICATION DATA

This application claims priority under 35 U.S.C. § 119 and/or § 365 to Japanese Application No. 2015-087836filed Apr. 22, 2015, the entire contents is incorporated herein by reference.

BACKGROUND OF THE INVENTION

1. Field of the Invention

The present invention relates to a numerical controller, and in particular, relates to a numerical controller that can eliminate the need for a skip signal and a key operation when coordinates of an object to be measured are acquired.

2. Description of the Related Art

When workpiece is machined by controlling a machine tool, it is necessary to measure the position of the workpiece placed in a machining area of the machine tool to set a workpiece coordinate system of the workpiece to be machined. In addition, it is necessary to measure dimensions of tools mounted on the spindle to set a tool offset amount.

As a conventional technology to measure a coordinate value of an object to be measured, for example, as disclosed in Japanese Patent Application Laid-Open No. 05-066820 A, there is a known method of bringing a touch sensor (probe) into contact with a workpiece by mounting the touch sensor on an axis moving portion of a feed axis of a machine tool and controlling the feed axis to drive, and acquiring a coordinate value by stopping (skipping) the drive of the feed axis by a skip signal input at this point to measure a coordinate value of the object to be measured based on the acquired coordinate value.

When the measuring method of a coordinate value using a skip signal as described above is adopted, however, a probe to detect contact needs to be prepared and also a mechanism to input a skip signal when the probe detects contact needs to be prepared, leading to a high price and posing a problem in terms of cost.

As another conventional technology, as shown in FIGS. 9A to 9C, a method of using a centering bar 3 is disclosed in Japanese Patent Application Laid-Open No. 2002-116016. The centering bar 3 includes, as shown in FIG. 9A, a fixed sleeve 4 and an eccentric sleeve 5 and is used by mounting the portion of the fixed sleeve 4 on the spindle of a machine tool. When the position of a workpiece is measured, as shown in FIG. 9B, the spindle is rotated while a central axis of the eccentric sleeve 5 is decentered from a rotary axis of the spindle (central axis of the fixed sleeve 4) and, as shown in FIG. 9C, the centering bar 3 is brought closer to a workpiece 6 by a key operation of a control panel. Then, a coordinate value of the spindle is acquired while visually checking that the deviation between the central axis of the fixed sleeve 4 and the central axis of the eccentric sleeve 5 has been eliminated by contact of the eccentric sleeve 5 of the centering bar 3 with the workpiece 6 being brought into contact and a coordinate value of an object to be measured is measured based on the acquired coordinate value.

When the measuring method of a coordinate value using a centering bar as described above is adopted, however, the operator needs to visually check the centering bar while operating a control panel and to perform key input work to set the coordinate value while viewing a screen after decentering is eliminated, which requires movement of line of sight and hands among the centering bar, screen, control panel, and keyboard, thereby posing a problem of increased burdens of the operator with increased trouble.

SUMMARY OF THE INVENTION

An object of the present invention is to provide a numerical controller capable of acquiring a coordinate value without a skip signal or a key operation by an operator.

A first aspect of the numerical controller according to the present invention is a numerical controller that controls a machine tool that measures a coordinate value of an object to be measured based on a position of a movable axis controlled by a manual operation, including: a coordinate value acquisition unit that acquires the coordinate value of the movable axis; a clock unit that clocks an elapsed unit time from a predetermined reference time point; a history storage unit that stores a plurality of pieces of history information formed by associating the coordinate value of the movable axis and the elapsed unit time when the coordinate value is acquired; a history recording unit that generates history information based on the coordinate value of the movable axis acquired by the coordinate value acquisition unit and the elapsed unit time clocked by the clock unit and records the generated history information in the history storage unit; a movement history analysis unit that analyzes timing when position adjustments of the movable axis are completed based on the history information recorded in the history storage unit; and a coordinate value setting unit that sets the coordinate value of the movable axis at the time when the analysis of the movement history analysis unit is performed.

The movement history analysis unit may be configured to set a time point when movement of the movable axis stops for a first time as the timing when the position adjustments of the movable axis are completed.

The movement history analysis unit may be configured to set a time point when the movable axis stops for a second time after moving at a first speed or less as the timing when the position adjustments of the movable axis are completed.

The movement history analysis unit may be configured to set, when the movable axis moves a first distance or more at a second speed or more after a direction of movement of the movable axis changes, a time point when the direction of movement of the movable axis changes as the timing when the position adjustments of the movable axis are completed.

A second aspect of the numerical controller according to the present invention is a numerical controller that controls a machine tool that measures a coordinate value of an object to be measured based on a position of a movable axis controlled by a handle operation, including: a handle information acquisition unit that acquires handle information containing information of a direction of rotation and a speed of a handle; a coordinate value acquisition unit that acquires the coordinate value of the movable axis; a clock unit that clocks an elapsed unit time from a predetermined reference time point; a history storage unit that stores a plurality of pieces of history information formed by associating the handle information, the coordinate value of the movable axis, and the elapsed unit times when the handle information and the coordinate value are acquired; a history recording unit that generates history information based on the coordinate value of the movable axis acquired by the coordinate value acquisition unit and the elapsed unit time clocked by the clock unit and records the generated history information in the history storage unit; a movement history analysis unit that analyzes timing when position adjustments of the movable axis are completed based on the history information recorded in the history storage unit; and a coordinate value setting unit that sets the coordinate value of the movable axis at the time when the analysis of the movement history analysis unit is performed.

The movement history analysis unit may be configured to set a time point when rotation of the handle stops for a first time as the timing when the position adjustments of the movable axis are completed.

The movement history analysis unit may be configured to set a time point when the handle stops for a second time after rotating at a third speed or less as the timing when the position adjustments of the movable axis are completed.

The movement history analysis unit may be configured to set, when the handle rotates for a third time or more at a fourth speed or more after a direction of rotation of the handle changes, a time point when the direction of rotation of the handle changes as the timing when the position adjustments of the movable axis are completed.

According to the present invention, workpiece coordinates can be detected using a measuring device such as a centering bar without preparing a mechanism using an expensive probe and without placing excessive burdens on an operator.

BRIEF DESCRIPTION OF THE DRAWINGS

The above and other objects and features of the present invention will be apparent from the description of embodiments below with reference to appended drawings. Among these drawings:

FIG. 4 is a diagram illustrating a first example of the analysis of position adjustment termination timing by the numerical controller in FIG. 3;

FIG. 5 is a diagram illustrating a second example of the analysis of the position adjustment termination timing by the numerical controller in FIG. 3;

FIG. 7 is a diagram illustrating a third example of the analysis of the position adjustment termination timing by the numerical controller in FIG. 3;

FIG. 8 is a diagram illustrating a case where the position adjustment termination timing shown in FIG. 7 is analyzed using the handle information.

DETAILED DESCRIPTION OF THE PREFERRED EMBODIMENTS

The present invention provides a function that analyzes the motion of each axis caused by an operator's movement operation of a movable axis when a coordinate value is measured using a measuring device such as a centering bar or a tool to automatically acquire a coordinate value based on a result of the analysis. The description will be provided below by taking a case where a centering bar is mounted on the spindle as one of movable axes as an example.

Figure 1A:
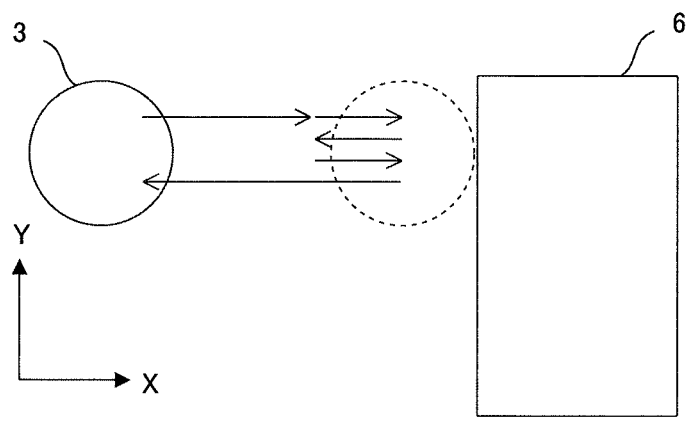
FIGS. 1A and 1B are diagrams illustrating a coordinate value acquisition function with which a numerical controller according to the present invention is provided.
Figure 1B:
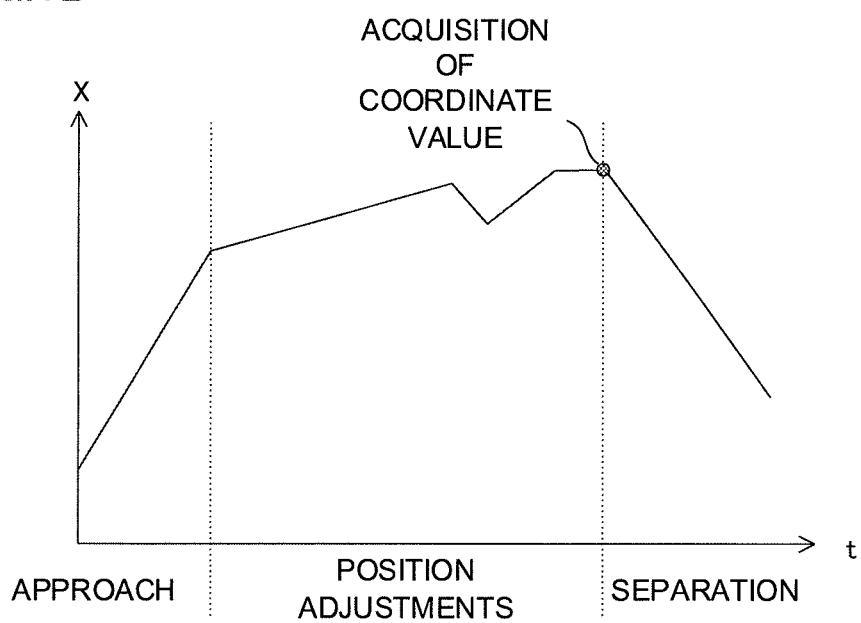

FIGS. 1A and 1B show an example of a movement operation of a centering bar.

In general, when measuring a coordinate value by using a centering bar, as shown in FIG. 1A, an operator first brings the spindle on which the centering bar 3 is mounted closer to a position of a predetermined distance from the workpiece 6 (approach stage) and repeats an operation of bringing the spindle closer to the workpiece 6 so as to come into contact therewith and moving away from the spindle when moving too far, while slowing down the traveling speed and focusing on an eccentric state of the centering bar 3 (position adjustment stage). Then, after making sure that the eccentric state has been eliminated, the operator separates the spindle away from the workpiece 6 (separation stage).

FIG. 1B is a graph showing time-shift of the coordinate position (position in the X-axis direction) of (the spindle mounted with) the centering bar 3 when the operation shown in FIG. 1A is performed. The coordinate value acquisition function of the numerical controller according to the present invention analyzes the relationship between a coordinate value X and a time t between the position adjustment stage and the separation stage shown in FIG. 1B to acquire the coordinate value of the centering bar before moving away from the workpiece, triggered by an operation to move away from the workpiece, after the position of the centering bar is adjusted.

Figure 2:
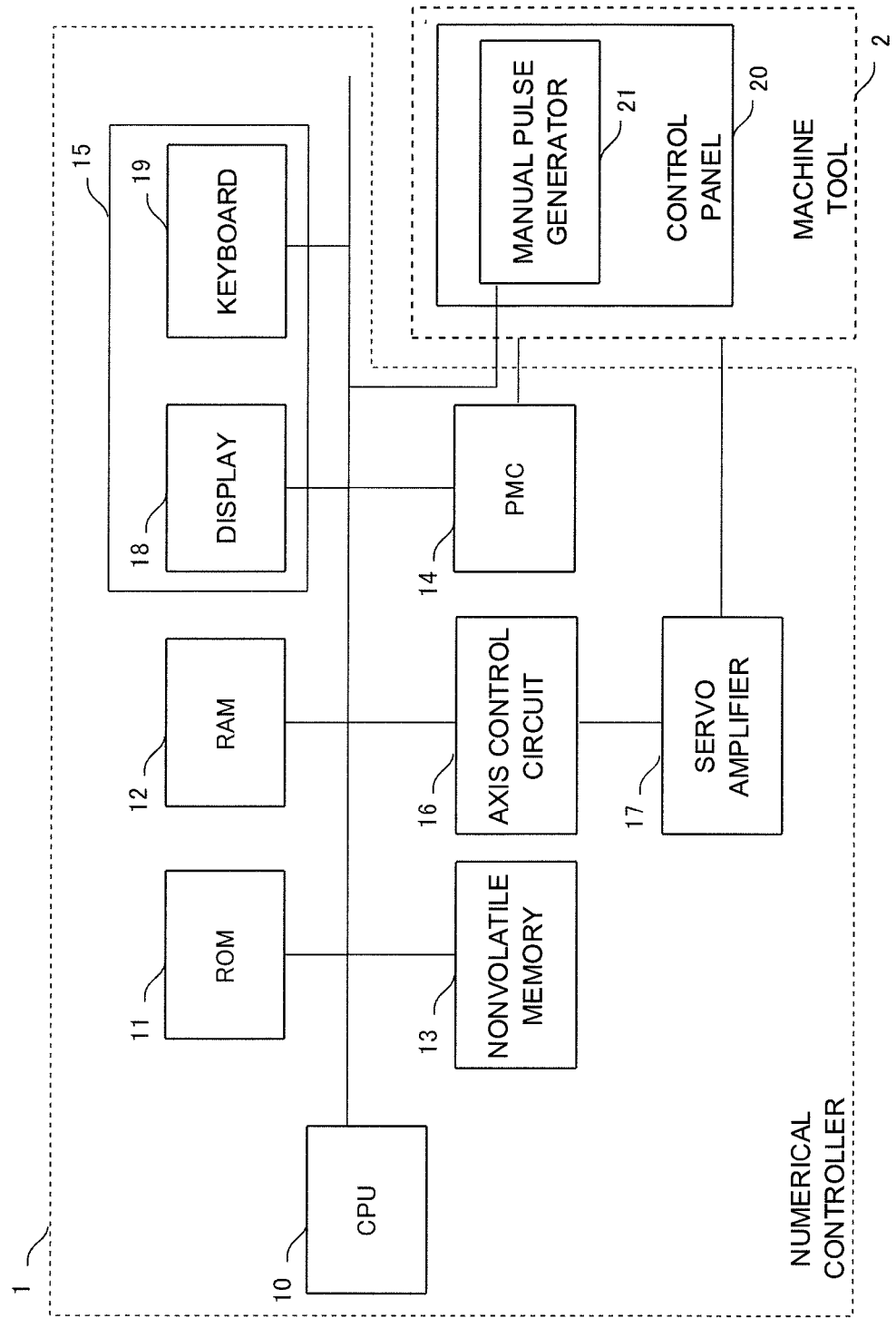
FIG. 2 is a block diagram of principal units of a numerical controller according to an embodiment of the present invention implementing the coordinate value acquisition function and a machine tool controlled by the numerical controller.

FIG. 2 is a block diagram of principal units of a numerical controller according to an embodiment of the present invention to implement the above function and a machine tool.

A numerical controller 1 includes a CPU 10 that controls the numerical controller 1 as a whole and a ROM 11, a RAM 12, a nonvolatile memory 13, a PMC 14, a display/MDI unit 15, and an axis control circuit 16 are connected to the CPU 10.

The ROM 11 has a system program to control the numerical controller 1 as a whole stored therein. The RAM 12 has temporary data needed for operation of the numerical controller 1 and a machining program used by the numerical controller 1 to control a machine tool 2 stored therein. The machining program is normally stored in the nonvolatile memory 13 and read from the nonvolatile memory 13 to store into the RAM 12 for execution.

Then, while reading the machining program from the RAM 12, the CPU 10 controls the axis control circuit 16 by sequentially executing the machining program and also controls a servo motor of each axis included in the machine tool 2 via a servo amplifier 17. A position/speed detector is contained in the servo motor of each axis included in the machine tool 2 and feedback control of the position/speed is exercised by giving feedback of a position/speed feedback signal from the position/speed detector to the axis control circuit 16. In the block diagram, description of feedback of the position/speed is omitted.

The programmable machine controller (PMC) 14 is a sequence program contained in the numerical controller 1 and controls auxiliary devices and the like on the machine tool side.

The display/MDI unit 15 includes a display 18 that displays status information of the numerical controller 1 and information about machining conditions and a keyboard 19 that receives an operator's operation.

The machine tool 2 controlled by the numerical controller 1 includes a control panel 20 used by the operator to operate the machine tool 2. The control panel 20 includes a manual pulse generator 21 constructed of switches, a handle and the like and the operator can directly drive each axis by operating the manual pulse generator 21 to manually control the servo motor of each axis included in the machine tool 2.

The coordinate value acquisition function included in the numerical controller 1 in FIG. 2 will be described in detail below.

Figure 3:
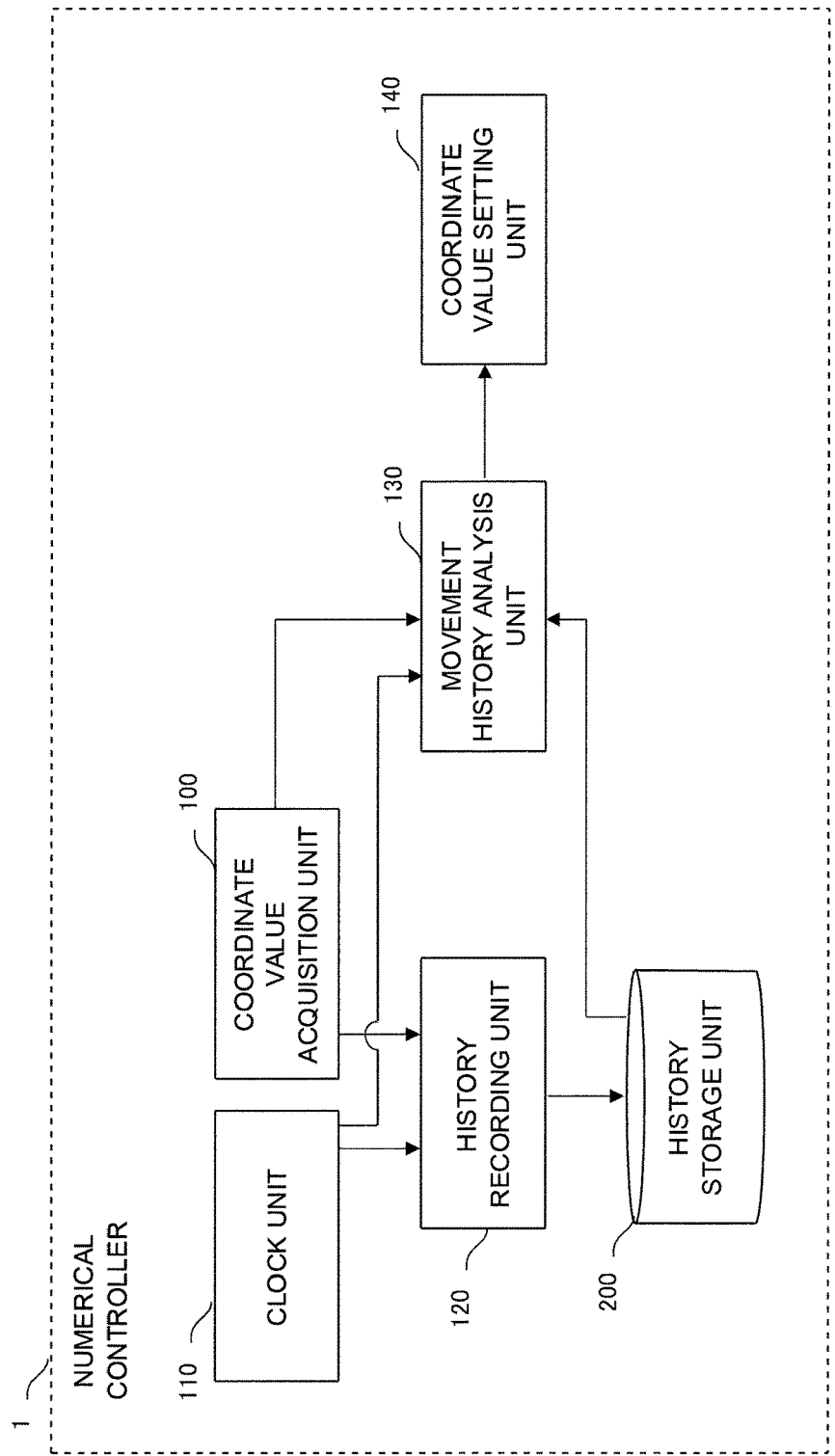
FIG. 3 is a functional block diagram of a numerical controller according to an embodiment of the present invention implementing the coordinate value acquisition function.

FIG. 3 represents the functions included in the numerical controller 1 as a functional block diagram.

The numerical controller 1 includes a coordinate value acquisition unit 100, a clock unit 110, a history recording unit 120, a movement history analysis unit 130, a coordinate value setting unit 140, and a history storage unit 200.

When the numerical controller 1 is set to a coordinate value acquisition mode by the operator, the coordinate value acquisition unit 100 acquires and outputs position information of the spindle of the machine tool 2 fed back to the axis control circuit 16 as a coordinate value.

The clock unit 110 outputs an elapsed unit time obtained by clocking a unit time elapsed from a reference time point. The clock unit 110 may be configured to output the current time (in this case, for example, the reference time point is 0 o'clock and the unit time is 1 s) from the clock (RTC) included in the numerical controller 1 as an elapsed unit time or may be configured to output the elapsed time from the time when switched to the coordinate value acquisition mode as an elapsed unit time. Alternatively, the clock unit 110 may be configured to set an internal operation cycle of the numerical controller 1 as a unit time and to output the count value of the number of internal operation cycles after starting to acquire the coordinate value, as an elapsed unit time.

Then, the history recording unit 120 stores, in the history storage unit 200, history information of the spindle in which the coordinate value of the spindle output from the coordinate value acquisition unit 100 is associated with the elapsed unit time output from the clock unit 110.

A recording of history information in the history storage unit 200 is made by the history recording unit 120 in every preset predetermined cycle and, while the numerical controller 1 is set to the coordinate value acquisition mode, as many recordings as the preset predetermined number are made. If the number of pieces of recorded history information exceeds the predetermined number, new history information is recorded while old history information is deleted so that the predetermined number is not exceeded.

When the numerical controller 1 is set to the coordinate value acquisition mode, the movement history analysis unit 130 analyzes the timing when position adjustments by the operator are completed by analyzing time-shift of the coordinate value of the spindle included in the machine tool 2 up to now based on history information acquired by the history storage unit 200. When the timing is analyzed, the analysis may be based on only information stored in the history storage unit 200 or the current coordinate value of the spindle output from the coordinate value acquisition unit 100 or the elapsed unit time output from the clock unit 110 may further be used.

Various methods of how to analyze the timing when position adjustments by the operator are completed can be considered. Hereinafter, some representative analysis methods are shown. In diagrams illustrating each analysis method, only graphs of the relationship between the X-axis coordinate value and the time are shown to simplify the description, but the methods can also be applied to the relationship between the coordinate value of any direction such as the Y axis or the Z axis and the time.

<Analysis Method 1: Method Based on the Stop Time>

When making position adjustments of a centering bar, the operator visually checks if the eccentric state of the centering bar has been eliminated by operating the control panel to bring the spindle on which the centering bar is mounted closer to a workpiece or move the spindle away from the workpiece. At this time, focusing on the fact that the operation by the operator stops when position adjustments are completed, as shown in FIG. 4, the time point when there is no change of the coordinate value of the spindle for a predetermined time T is detected as the timing when position adjustments by the operator are completed and the coordinate value obtained by correcting the coordinate value of the spindle at that time by the distance equal to the radius of the centering bar is set as the coordinate value of the workpiece.

The predetermined time T may be preset to the numerical controller 1 or may be made settable by the operator when the numerical controller 1 is switched to the coordinate value acquisition mode.

<Analysis Method 2: Method Based on the Traveling Speed and the Stop Time>

When making position adjustments of a centering bar, the operator operates the control panel to bring the spindle on which the centering bar is mounted closer to a workpiece or move the spindle away from the workpiece and makes fine adjustments by slowing down the traveling speed of the spindle immediately before the eccentric state of the centering bar is eliminated. Thus, as shown in FIG. 5, if there is no change of the coordinate value of the spindle for a predetermined time T after moving at a speed that does not exceed a predetermined speed $\tan\theta$, the time point is detected as the timing when position adjustments by the operator are completed and the coordinate value obtained by correcting the coordinate value of the spindle at that time by the distance equal to the radius of the centering bar is set as the coordinate value of the workpiece.

The predetermined speed $\tan\theta$ and the predetermined time T may be preset to the numerical controller 1 or may be made settable by the operator when the numerical controller 1 is switched to the coordinate value acquisition mode.

Figure 6:
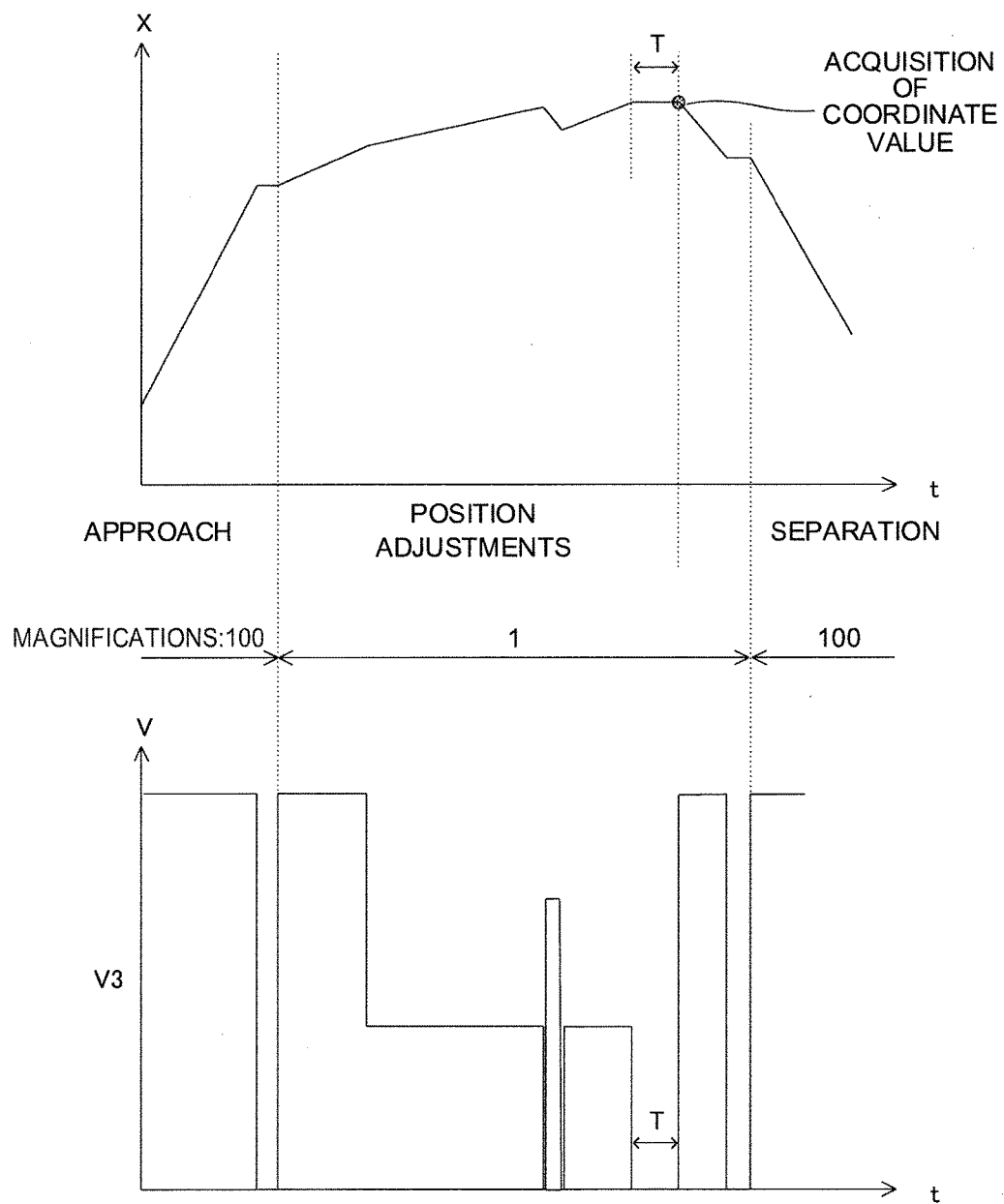
FIG. 6 is a diagram illustrating a case where the position adjustment termination timing shown in FIG. 5 is analyzed using handle information.
Figure 9A:
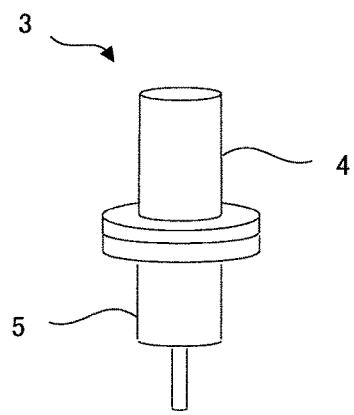
FIGS. 9A to 9C are diagrams illustrating a conventional technology of a measuring method of workpiece coordinates using a centering bar constructed of a fixed sleeve and an eccentric sleeve.
Figure 9B:
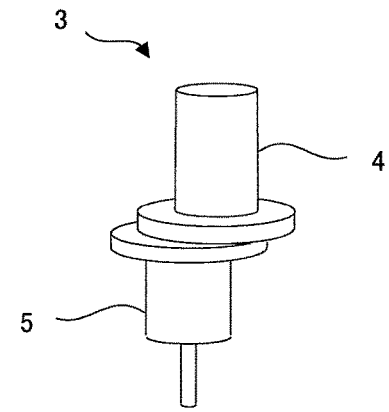
Figure 9C:
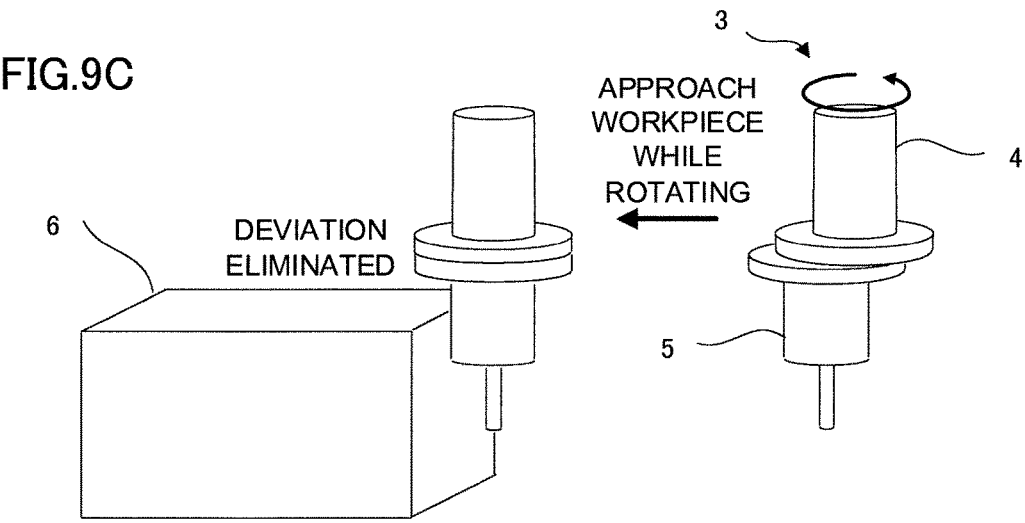

As a method of detecting the timing from information of a handle operating the spindle movement, as shown in FIG. 6, if there is no rotation of the handle for a predetermined time T after the handle is rotated at a speed that does not exceed a predetermined speed $V_3$, the time point is detected as the timing when position adjustments by the operator are completed and the coordinate value obtained by correcting the coordinate value of the spindle at that time by the distance equal to the radius of the centering bar is set as the coordinate value of the workpiece.

The predetermined speed $V_3$ and the predetermined time T may be preset to the numerical controller 1 or may be made settable by the operator when the numerical controller 1 is switched to the coordinate value acquisition mode.

Compared with the analysis method 1, the present analysis method can prevent erroneous detection of the coordinate value when, for example, the operator's operation stops for some reason while approaching or the like.

<Analysis Method 3: Method of Detecting Changes in the Direction of Movement>

When making position adjustments of a centering bar, the operator makes fine adjustments by slowing down the traveling speed of the spindle and bringing the spindle closer to a workpiece or moving the spindle away from the workpiece, and after the eccentric state of the centering bar is eliminated, the spindle is separated from the workpiece by raising the traveling speed of the spindle. Thus, as shown in FIG. 7, the coordinate value of the spindle in the timing when the direction of movement of the spindle on which a centering bar is mounted changes (if the spindle stops while the direction of movement changes, the timing when the spindle starts to move after stopping) is temporarily stored or marked in the history storage unit 200 and if the spindle moves a predetermined distance L at a speed equal to a predetermined speed tan θ or more from the stored or marked time point, the coordinate value obtained by correcting the coordinate value at the stored or marked time point by the distance equal to the radius of the centering bar is set as the coordinate value of the workpiece.

The predetermined speed tan θ and the predetermined distance L may be preset to the numerical controller 1 or may be made settable by the operator when the numerical controller 1 is switched to the coordinate value acquisition mode.

As a method of detecting the timing from information of a handle, as shown in FIG. 8, the coordinate value of the spindle in the timing when the direction of rotation of the handle changes (or in the timing when the handle starts to move after the stoppage of the handle in case where the handle stops while the direction of rotation changes) is temporarily stored or marked in the history storage unit 200 and if the handle is rotated for a predetermined time $T_3$ at a rotational speed equal to a predetermined speed $V_4$ or more from the stored or marked time point, the coordinate value obtained by correcting the coordinate value at the stored or marked time point by the distance equal to the radius of the centering bar is set as the coordinate value of the workpiece.

The predetermined speed $V_4$ and the predetermined time $T_3$ may be preset to the numerical controller 1 or may be made settable by the operator when the numerical controller 1 is switched to the coordinate value acquisition mode.

As the movement amount of the spindle can be specified by a magnification in case where the movement operation of the spindle is performed by handle. Accordingly, if the magnification is low, the traveling speed of the spindle may be slow even if the rotational speed of the handle is fast. Even if the handle is rotated fast when separating the spindle after the position of the spindle is fine-adjusted, there may be a case where the traveling speed of the spindle does not reach a predetermined speed tan φ, so such a separating movement of the spindle cannot be determined in some cases. But, such a separating movement can be determined by analyzing the rotational speed of the handle.

Then, the coordinate value setting unit 140 sets the coordinate value of the spindle at the time when the analysis of the movement history analysis unit 130 is performed, as the measured coordinate value of the workpiece.

Therefore, the numerical controller 1 according to the present embodiment can detect workpiece coordinates by using a centering bar without preparing a mechanism using an expensive probe and without placing excessive burdens on the operator.

In the foregoing, an embodiment of the present invention has been described, but the present invention is not limited to only examples of the above embodiment and can be carried out in various forms by making appropriate alterations.

For example, in the analysis method by the movement history analysis unit 130, only one analysis method may be incorporated into the numerical controller 1, or a plurality of analysis methods may be incorporated in the numerical controller 1 so that the analysis method can be selected when an operator sets the numerical controller 1 to the coordinate value acquisition mode, or a plurality of consistent analysis methods may be combined.

In the above embodiment, information such as the direction of movement or the traveling speed of an axis is assumed to be analyzed based on time-shift of the coordinate value of a movable axis, but, for example, a configuration that acquires the direction of rotation and the speed of a handle installed in a pulse generator may be provided so that information such as the direction of movement or the traveling speed of an axis is determined from information related to an operation of the handle.

The invention claimed is:

1. A numerical controller that controls a machine tool to measure a coordinate value of an object to be measured based on a position of a movable axis controlled by a manual operation, the numerical controller comprising:
   a coordinate value acquisition unit that acquires and outputs position information of the machine tool as a coordinate value of the movable axis;
   a clock unit that clocks an elapsed unit time from a predetermined reference time point;
   a history storage unit that stores a plurality of pieces of history information formed by associating the coordinate value of the movable axis and the elapsed unit time when the coordinate value is acquired;
   a history recording unit that generates history information based on the coordinate value of the movable axis acquired by the coordinate value acquisition unit and the elapsed unit time clocked by the clock unit and records the generated history information in the history storage unit;
   a movement history analysis unit that analyzes timing when position adjustments of the movable axis are completed based on the history information recorded in the history storage unit; and
   a coordinate value setting unit that sets the coordinate value of the movable axis at the time when the analysis of the movement history analysis unit is performed as a measured coordinate value of the object to be measured.

2. The numerical controller according to claim 1, wherein the movement history analysis unit is configured to set a time point when, movement of the movable axis stops for a first time as the timing when the position adjustments of the movable axis are completed.

3. The numerical controller according to claim 1, wherein the movement history analysis unit is configured to set a time point when the movable axis stops for a second time after moving at a first speed or less as the timing when the position adjustments of the movable axis are completed.

4. The numerical controller according to claim 1, wherein the movement history analysis unit is configured to set, when the movable axis moves a first distance or more at a second speed or more after a direction of movement of the movable axis changes, a time point when the direction of movement of the movable axis changes as the timing when the position adjustments of the movable axis are completed.

5. A numerical controller that controls a machine tool to measure a coordinate value of an object to be measured based on a position of a movable axis controlled by a handle operation, the numerical controller comprising:
   a handle information acquisition unit that acquires handle information containing information of a direction of rotation and a speed of a handle;

a coordinate value acquisition unit that acquires and outputs position information of the machine tool as a coordinate value of the movable axis;

a clock unit that clocks an elapsed unit time from a predetermined reference time point;

a history storage unit that stores a plurality of pieces of history information formed by associating the handle information, the coordinate value of the movable axis, and the elapsed unit times when the handle information and the coordinate value are acquired;

a history recording unit that generates history information based on the coordinate value of the movable axis acquired by the coordinate value acquisition unit and the elapsed unit time clocked by the clock unit and records the generated history information in the history storage unit;

a movement history analysis unit that analyzes timing when position adjustments of the movable axis are completed based on the history information recorded in the history storage unit; and a coordinate value setting unit that sets the coordinate value of the movable axis at the time when the analysis of the movement history analysis unit is performed as a measured coordinate value of the object to be measured.

6. The numerical controller according to claim 5, wherein the movement history analysis unit is configured to set a time point when rotation of the handle stops for a first time as the timing when the position adjustments of the movable axis are completed.

7. The numerical controller according to claim. 5, wherein the movement history analysis unit is configured to set a time point when rotation of the handle stops for a second time after rotating at a third speed or less as the timing when the position adjustments of the movable axis are completed.

8. The numerical controller according to claim 5, wherein the movement history analysis unit is configured to set, when the handle rotates for a third time or more at a fourth speed or more after a direction of rotation of the handle changes, a time point when the direction of rotation of the handle changes as the timing when the position adjustments of the movable axis are completed.

* * * * *